UNITED STATES PATENT OFFICE.

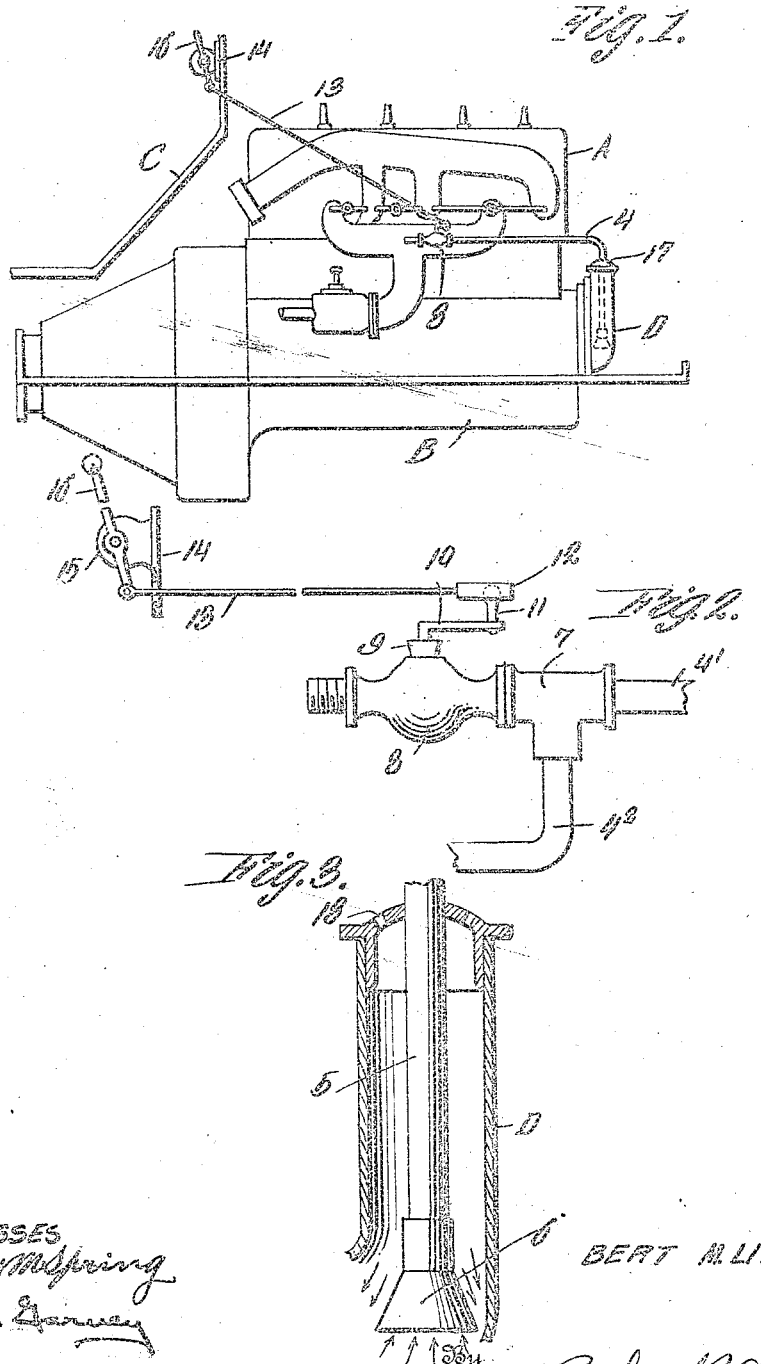

BERT M. LITTLE, OF HAMILTON, ONTARIO, CANADA.

ATTACHMENT FOR INTERNAL-COMBUSTION ENGINES.

1,394,747.  Specification of Letters Patent.  Patented Oct. 25, 1921.

Application filed December 2, 1920. Serial No. 427,965.

*To all whom it may concern:*

Be it known that I, BERT M. LITTLE, a subject of the King of Great Britain, residing at Hamilton, in the Province of Ontario, Dominion of Canada, have invented certain new and useful Improvements in Attachments for Internal-Combustion Engines, of which the following is a specification.

This invention relates to attachments for internal combustion engines, the principal object of the invention being to utilize hydrocarbon fumes induced from the crank case of the engine, thereby increasing the mileage and reducing the fuel consumption to a minimum.

A further object of the invention is to provide an attachment of the above nature which may be conveniently associated with standard types of motor vehicles so as to especially adapt the same for use in this capacity and being controlled by the operator of the vehicle.

The above and other objects of the invention will be in part described and in part understood from the following description of the present preferred embodiment of the invention taken in connection with the accompanying drawings, wherein:

Figure 1, is a side elevational view of a device constructed in accordance with this invention illustrating its application.

Fig. 2, is a similar view of the device *per se* fragmentarily shown and illustrating the manner of usage where a plurality of breather pipes are used, and Fig. 3, is a fragmentary vertical sectional view of the breather pipe showing the manner of connection of my invention thereto.

In the drawings, in order to illustrate the application of my invention, an internal combustion engine generally designated A is provided which may be of the usual or any desired configuration, and is equipped with an engine crank case B. The engine is shown as associated with a dash board C of a motor vehicle, which is likewise shown to be of a conventional type. A breather pipe D is connected to the crank case in a manner well known in the art, and extends slightly thereabove.

The device of this invention consists especially of an induction pipe 4, which extends horizontally in parallelism with the engine A and is then bent downwardly at right angles so as to extend into the breather pipe D as indicated at 5. The lower terminal of said right angled portion is equipped with a funnel shaped head 6, which is arranged substantially in alinement with the opening in the crank case through which the breather pipe extends. It will be noted that this funnel shaped head is relatively smaller than the internal diameter of the breather pipe to permit the passage of air between the outer periphery of said head and the inner periphery of the breather pipe in a manner hereinafter explained.

Where a plurality of breather pipes are used a T-shaped connection 7 is used so as to connect the induction pipes 4' and 4², which lead from the breather pipe as fragmentarily shown in Fig. 2.

Where a single breather pipe is used as shown in Fig. 1 of the drawings, a valve casing 8 used in my invention is connected directly to the induction pipe 4, whereas when a plurality of breather pipes are used, the T 7 is connected to the valve casing 8 in a manner shown in Fig. 2 of the drawings. The valve casing has a plug valve 9, or any other desired type of valve, associated therewith, to which is connected one end of a crank arm 10, the opposite end of said arm being engaged with one end of a stub shaft 11, the opposite end of said shaft having a spherical enlargement formed thereon which engages a correspondingly formed boxing 12. In this way a universal connection is provided which is controlled by an operating rod 13, one end of which is connected to the boxing 12, while the opposite end extends through the dash board C, or else through a plate 14 carried by the dash board, in a manner shown in Fig. 2. The plate 14 has an ear 15 extending outwardly therefrom upon which is pivotally mounted an operating lever 16. One end of the lever is pivotally engaged with the rod 13, while the opposite end extends upwardly from the ear 15 and is preferably enlarged so as to be conveniently manipulated by the operator. The ear 15 is also preferably corrugated or notched so as to permit maintenance of the lever 16 in any desired position of adjustment.

Mounted upon the breather pipe D is a cap 17 which, preferably, snugly engages said breather pipe and is provided with a central opening through which the right angled end 5 of the induction pipe extends. The cap is provided with perforations 18 which permits the entrance of air through the breather pipe and into the crank case.

In operation, the air is permitted to pass into the crank case in a manner above described and the hydro-carbon fumes are induced from the crank case through the funnel shaped head 6, tube 4, and ultimately into the intake manifold of the engine with obvious beneficial results. The volume of these fumes is controlled by the adjustment of the lever 16 which in conjunction with varying the charge into the manifold may be used to completely close the valve 9 to prevent the influx of the fumes into the engine when the gear shift lever is in a neutral position, thereby preventing the engine from racing. Other advantages of this device will be apparent, and it is understood that various changes may be made by me within the scope of the appended claims.

What is claimed is:

1. An attachment for internal combustion engines including an induction pipe, one end of which is extended into the breather pipe of the engine and equipped with a funnel shaped head to direct the hydro-carbon fumes from said breather pipe into said induction pipe, the opposite end of said induction pipe being extended into the intake manifold of the engine substantially as described.

2. An attachment for internal combustion engines including a perforated cap mounted upon the breather pipe of the engine and provided with a central opening, an induction pipe, one end of which extends through said cap and is equipped with a funnel shaped head which terminates at the jointure of the breather pipe with the engine to receive gaseous fumes emanating from the latter, the opposite end of said induction pipe communicating with the intake manifold of the engine.

In testimony whereof I affix my signature in presence of two witnesses.

BERT M. LITTLE.

Witnesses:
 MONTAGUE GOLDING,
 JAY HAROLD MORTIMER.